(12) United States Patent
Kishimoto et al.

(10) Patent No.: US 10,164,234 B2
(45) Date of Patent: Dec. 25, 2018

(54) SEPARATOR ROLL AND METHOD OF PRODUCING SAME

(71) Applicant: Sumitomo Chemical Company, Limited, Tokyo (JP)

(72) Inventors: Hitoshi Kishimoto, Niihama (JP); Yousuke Tsukuda, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/139,968

(22) Filed: Apr. 27, 2016

(65) Prior Publication Data

US 2016/0322622 A1    Nov. 3, 2016

(30) Foreign Application Priority Data

Apr. 30, 2015  (JP) ................. 2015-093011

(51) Int. Cl.
| | |
|---|---|
| *H01M 2/18* | (2006.01) |
| *H01M 2/14* | (2006.01) |
| *H01M 10/0525* | (2010.01) |
| *B65H 75/08* | (2006.01) |
| *B65H 75/00* | (2006.01) |
| *B65H 75/02* | (2006.01) |

(52) U.S. Cl.
CPC ............ *H01M 2/18* (2013.01); *B65H 75/00* (2013.01); *B65H 75/02* (2013.01); *B65H 75/08* (2013.01); *H01M 2/145* (2013.01); *H01M 10/0525* (2013.01)

(58) Field of Classification Search
CPC .... H01M 2/18; H01M 2/145; H01M 10/0525; B65H 75/00; B65H 75/08
See application file for complete search history.

(56) References Cited

U.S. PATENT DOCUMENTS

| | | | | |
|---|---|---|---|---|
| 3,312,408 A | * | 4/1967 | Owens ................... | B65H 18/20 242/541.4 |
| 2012/0164538 A1 | | 6/2012 | Inagaki et al. | |
| 2014/0322585 A1 | | 10/2014 | Iizuka et al. | |
| 2016/0308183 A1 | * | 10/2016 | Matsuo ................. | H01M 2/166 |

(Continued)

FOREIGN PATENT DOCUMENTS

| | | | | |
|---|---|---|---|---|
| JP | 2008066051 A | * | 3/2008 | |
| JP | 3172995 U | * | 1/2012 | ............. B65H 75/10 |
| JP | WO 2013084988 A1 | * | 6/2013 | ............. B65H 75/10 |

(Continued)

OTHER PUBLICATIONS

Matsushita et al. (JP 3172995U), Jan. 19, 2012 (JPP machine translation to English).*

(Continued)

*Primary Examiner* — Frank J Vineis
*Assistant Examiner* — Donald M Flores, Jr.
(74) *Attorney, Agent, or Firm* — Panitch Schwarze Belisario & Nadel LLP

(57) ABSTRACT

A separator roll etc. capable of reducing meandering is provided. The separator roll includes a core and a battery separator wound around the core. The core has an axis hole along a central axis of the core. A value, obtained by dividing a difference between a diameter of the core and a diameter of the axis hole by a width of the core in a direction of the central axis, is not less than 0.3 and not more than 1.5.

6 Claims, 9 Drawing Sheets

(56) References Cited

U.S. PATENT DOCUMENTS

2016/0325449 A1* 11/2016 Nomura .................. B26D 1/02
2016/0325450 A1* 11/2016 Nomura .................. B26D 1/02

FOREIGN PATENT DOCUMENTS

| | | |
|---|---|---|
| JP | 2013139340 A | 7/2013 |
| JP | 2016044184 A | 4/2016 |
| WO | 2011024849 A1 | 3/2011 |

OTHER PUBLICATIONS

Ozora et al. (WO 2013084988A1), Jun. 2013 (Google Patents machine translation to English).*
(JP 2008-066051 A). (Mar. 21, 2008) (EPO—Machine translation to English). (Year: 2008).*
Office Action dated Jul. 26, 2016 in JP Applicatin No. 2015-093011.

* cited by examiner

SEPARATOR ROLL AND METHOD OF PRODUCING SAME

This Nonprovisional application claims priority under 35 U.S.C. § 119 on Patent Application No. 2015-093011 filed in Japan on Apr. 30, 2015, the entire contents of which are hereby incorporated by reference.

TECHNICAL FIELD

The present invention relates to a separator roll obtained by winding a battery separator around a core, and to a method of producing the separator roll.

BACKGROUND ART

A lithium-ion secondary battery includes therein a positive electrode and a negative electrode which are separated by a porous separator. In production of lithium ion secondary batteries, a separator roll is used. The separator roll is obtained by winding this separator around a core having a cylindrical shape.

Patent Literature 1 discloses a separator roll having a core whose outer diameter is 5 inch or more. Patent Literature 2 discloses a separator roll having a core whose outer diameter is 200 mm and whose internal diameter of an axis-bearing section is 75 mm.

CITATION LIST

Patent Literature

[Patent Literature 1]
WO 2011/024849 (published on Mar. 3, 2011)
[Patent Literature 2]
Japanese Patent Application Publication Tokukai No. 2013-139340 (published on Jul. 18, 2013)

SUMMARY OF INVENTION

Technical Problem

In a case of producing an application product of a battery separator (e.g. lithium ion secondary battery), a battery separator is wound off from a core of a separator roll before the battery separator is used. At that time, it is preferable that the battery separator can be wound off straightly to a predetermined position of the application product. However, there is a case where the battery separator meanders when wound off from the core. Patent Literatures 1 and 2 do not consider this meandering at all.

The present invention was made in view of the foregoing problem. An object of the present invention is to provide a separator roll capable of reducing meandering and a method of producing the separator roll.

Solution to Problem

In order to solve the foregoing problem, a separator roll of the present invention is a separator roll, including: a core; and a battery separator wound around the core, the core having an axis hole along a central axis of the core, a value being not less than 0.3 and not more than 1.5, the value being obtained by dividing, by a width of the core in a direction of the central axis, a difference between a diameter of the core and a diameter of the axis hole.

A separator roll of the present invention is a separator roll, including: a core; and a battery separator wound around the core, the core having an axis hole along a central axis of the core, the core having a diameter of less than 125 mm, a diameter ratio, obtained by dividing the diameter of the core by a diameter of the axis hole, being not less than 1.25 and not more than 1.65.

A method of the present invention of producing a separator roll is a method of producing a separator roll, the separator roll including a core and a battery separator wound around the core, the core having an axis hole along a central axis of the core, a value being not less than 0.3 and not more than 1.5, the value being obtained by dividing, by a width of the core in a direction of the central axis, a difference between a diameter of the core and a diameter of the axis hole, the method comprising the steps of: inserting a take-up roller into the axis hole and fixing the core to the take-up roller; and winding the battery separator around the core while rotating the core along with the take-up roller.

A method of the present invention of producing a a separator roll is a method of producing a separator roll, the separator roll including a core and a battery separator wound around the core, the core having an axis hole along a central axis of the core, the core having a diameter of less than 125 mm, a diameter ratio, obtained by dividing the diameter of the core by a diameter of the axis hole, being not less than 1.25 and not more than 1.65, the method comprising the steps of: inserting a take-up roller into the axis hole and fixing the core to the take-up roller; and winding the battery separator around the core while rotating the core along with the take-up roller.

A method of the present invention of producing a separator roll is a method of producing a separator roll, the separator roll including a core and a battery separator wound around the core, the core having an axis hole along a central axis of the core, the method comprising the steps of: inserting a take-up roller into the axis hole and fixing the core to the take-up roller; and winding the battery separator around the core while rotating the core along with the take-up roller, a length represented by Formula [1] below being less than 1.00 mm.

$$(2nt+\varphi o)\tan(\cos^{-1}((\varphi i-x)/(w^2+\varphi i^2)^{1/2})-\cos^{-1}(\varphi i/(w^2+\varphi i^2)^{1/2})) \quad [1]$$

where
n is the number of times by which the battery separator is wound around the core,
t is an average thickness of the battery separator [μm],
φo is a diameter of the core [mm],
φi is a diameter of the axis hole [mm],
x is 0.2 mm, and
w is a width of the core in a direction of the central axis [mm].

Advantageous Effects of Invention

The present invention can reduce a meandering width as compared with a conventional separator roll. Furthermore, the present invention can produce a separator roll whose meandering width is smaller than that of a conventional separator roll.

DESCRIPTION OF EMBODIMENTS

[Basic Configuration]

As regards a battery separator, of the present invention, for which weight per unit area is to be measured, the following description will discuss (i) a lithium-ion secondary battery, (ii) a separator, (iii) a heat-resistant separator, (iv) a method of producing the separator and the heat-resistant separator, (v) a slitting apparatus, and (vi) a cutting device, in this order, each of which is a basic component of the present invention.

(Lithium-Ion Secondary Battery)

A nonaqueous electrolyte secondary battery, typified by a lithium-ion secondary battery, has a high energy density, and therefore is currently and widely used as (i) batteries for use in devices such as personal computers, mobile phones, and mobile information terminals, (ii) moving bodies such as automobiles and airplanes, and (iii) stationary batteries contributing to stable power supply.

Figure 1:
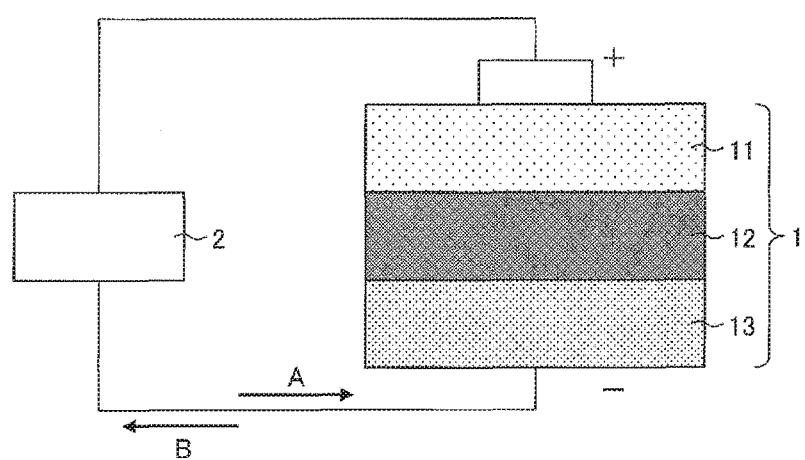
FIG. 1 is a schematic view illustrating a cross sectional configuration of a lithium-ion secondary battery.

FIG. 1 is a schematic view illustrating a cross sectional configuration of a lithium-ion secondary battery 1. As illustrated in FIG. 1, the lithium-ion secondary battery 1 includes a cathode 11, a separator 12 (battery separator), and an anode 13. Between the cathode 11 and the anode 13, an external device 2 is connected outside the lithium-ion secondary battery 1. This causes (i) electrons to move in a direction A while the lithium-ion secondary battery 1 is being charged and (ii) electrons to move in a direction B while the lithium-ion secondary battery 1 is being discharged.

(Separator)

The separator 12 is provided so as to be sandwiched between (i) the cathode 11 which is a positive electrode of the lithium-ion secondary battery 1 and (ii) the anode 13 which is a negative electrode of the lithium-ion secondary battery 1. The separator 12 is a porous film which causes the cathode 11 and the anode 13 to be separated and allows lithium ions to move between the cathode 11 and the anode 13. Materials of the separator 12 include polyolefin such as polyethylene or polypropylene.

Figure 2:
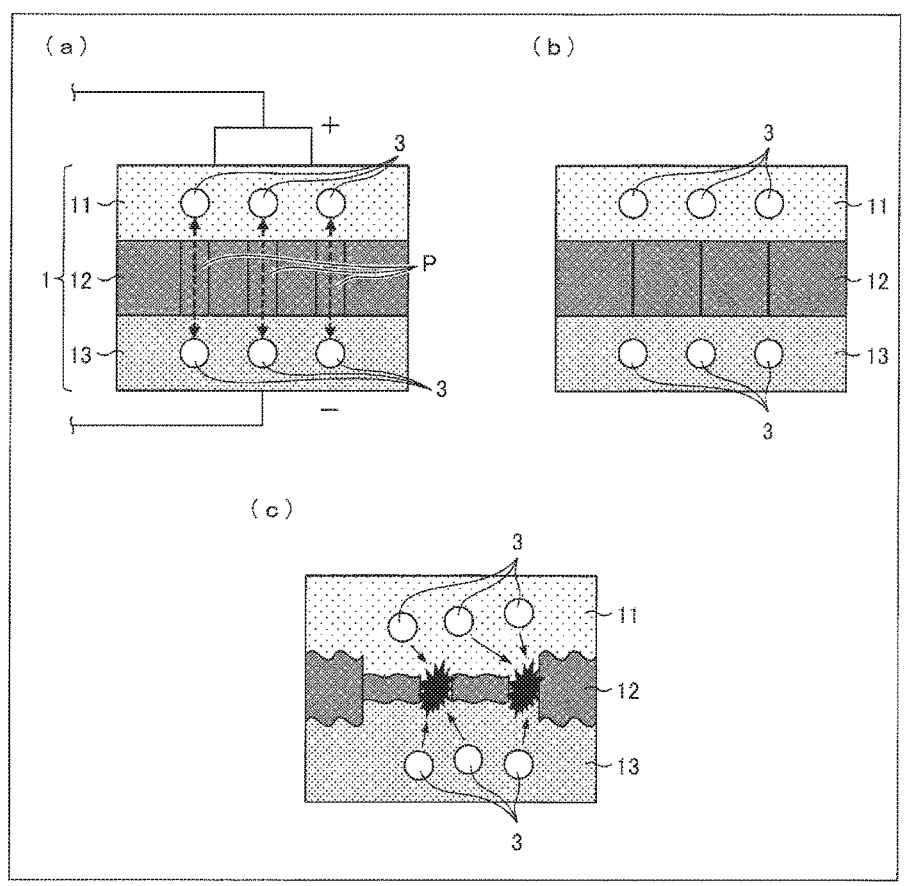
FIG. 2 is a schematic view illustrating details of the configuration of the lithium-ion secondary battery illustrated in FIG. 1.

FIG. 2 is a schematic view illustrating details of the configuration of the lithium-ion secondary battery 1 illustrated in FIG. 1. (a) of FIG. 2 illustrates a normal configuration. (b) of FIG. 2 illustrates a state in which a temperature of the lithium-ion secondary battery 1 has risen. (c) of FIG. 2 illustrates a state in which a temperature of the lithium-ion secondary battery 1 has sharply risen. As illustrated in (a) of FIG. 2, the separator 12 has many pores P. Normally, lithium ions 3 can move back and forth in the lithium-ion secondary battery 1, through the pores P.

The temperature of the lithium-ion secondary battery 1 may rise due to, for example, excessive charging of the lithium-ion secondary battery 1 or a high current caused by short-circuiting of the external device. This causes the separator 12 to be melt or soften, so that the pores P are blocked as illustrated in (b) of FIG. 2. As a result, the separator 12 shrinks. This causes the lithium ions 3 to stop moving back-and-forth, and ultimately causes the temperature of the lithium ion secondary battery 1 to sop rising.

Note, however, that in a case where a temperature of the lithium-ion secondary battery 1 sharply rises, the separator 12 suddenly shrinks. In this case, the separator 12 may be destroyed (see (c) of FIG. 2). This causes the lithium ions 3 to leak out from the separator 12 which has been destroyed. As a result, the lithium ions 3 will never stop moving back and forth. Consequently, the temperature continues to rise.

(Heat-Resistant Separator)

Figure 3:
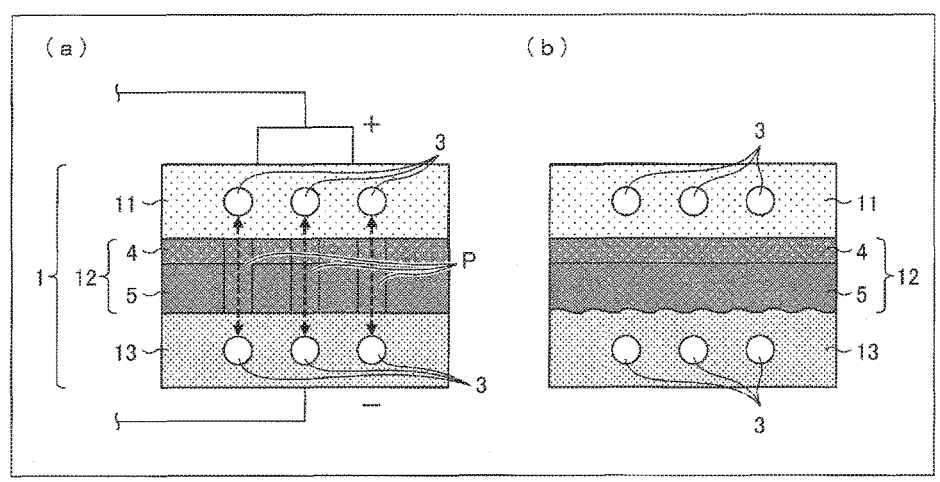
FIG. 3 is a schematic view illustrating another configuration of the lithium-ion secondary battery illustrated in FIG. 1.

FIG. 3 is a schematic view illustrating another configuration of the lithium-ion secondary battery 1 illustrated in FIG. 1. (a) of FIG. 3 illustrates a normal configuration, and (b) of FIG. 3 illustrates a state in which a temperature of the lithium-ion secondary battery 1 has sharply risen. As illustrated in (a) of FIG. 3, the separator 12 can be a heat-resistant separator including a porous film 5 and a heat-resistant layer 4. The heat-resistant layer 4 is stacked on a surface of the porous film 5 which surface is on a cathode 11 side. Note that the heat-resistant layer 4 can be alternatively stacked (i) on a surface of the porous film 5 which surface is on an anode 13 side or (ii) on both surfaces of the porous film 5. Furthermore, the heat-resistant layer 4 has pores which are similar to the pores P. Normally, the lithium ions 3 move back and forth through the pores P and the pores of the heat-resistant layer 4. Materials of the heat-resistant layer 4 include wholly aromatic polyamide (aramid resin).

Even in a case where the porous film 5 melts or softens due to a sharp rise in temperature of the lithium-ion secondary battery 1, the shape of the porous film 5 is maintained (see (b) of FIG. 3) because the heat-resistant layer 4 supports the porous film 5. This causes the porous film 5 to come off with melting or softening. Therefore, the pores P only blocks up. This causes the lithium ions 3 to stop moving back and forth, and ultimately causes the above-described excessive discharging or excessive charging to stop. In this way, the separator 12 is prevented from being destroyed.

(Production Steps of Separator and Heat-Resistant Separator)

How to produce the separator and the heat-resistant separator of the lithium-ion secondary battery 1 is not specifically limited. The separator and the heat-resistant separator can be produced by a well-known method. The following discussion assumes a case where the porous film 5 contains polyethylene as a main material. Note, however, that even in a case where the porous film 5 contains another material, the separator 12 (heat-resistant separator) can be produced by employing a similar production method.

Examples of such a similar production method encompass a method which includes the steps of forming a film by adding inorganic filler or a plasticizer to a thermoplastic resin, and then removing the inorganic filler or the plasticizer by means of an appropriate solvent. For example, in a case where the porous film 5 is a polyolefin separator made of a polyethylene resin containing ultrahigh molecular weight polyethylene, it is possible to produce the porous film 5 by the following method.

This method includes (1) a kneading step of obtaining a polyethylene resin composition by kneading a ultrahigh molecular weight polyethylene with (i) an inorganic filler (such as calcium carbonate or silica) or (ii) a plasticizer (such as low molecular weight polyolefin or fluid paraffin), (2) a rolling step of forming a film by means of the polyethylene resin composition, (3) a removal step of removing the inorganic filler or the plasticizer from the film obtained in the step (2), and (4) a stretching step of obtaining the porous film 5 by stretching the film obtained in the step (3). The step (4) can be alternatively carried out between the steps (2) and (3).

In the removal step, many fine pores are formed in the film. The fine pores of the film stretched in the stretching step serve as the above-described pores P. The porous film 5 (separator 12 having no heat-resistant layer) is thus obtained. Note that the porous film 5 is a polyethylene microporous film having a prescribed thickness and a prescribed air permeability.

Note that, in the kneading step, (i) 100 parts by weight of the ultrahigh molecular weight polyethylene, (ii) 5 parts by weight to 200 parts by weight of a low-molecular weight polyolefin having a weight-average molecular weight of 10000 or less, and (iii) 100 parts by weight to 400 parts by weight of the inorganic filler can be kneaded.

Thereafter, in a coating step, the heat-resistant layer 4 is formed on the porous film 5. For example, by applying, onto the porous film 5, an aramid/NMP (N-methylpyrrolidone) solution (coating solution), the heat-resistant layer 4 that is an aramid heat-resistant layer is formed. The heat-resistant layer 4 can be formed on a single surface or both surfaces of the porous film 5. Alternatively, the heat-resistant layer 4 can be formed on the porous film 5, by applying, on the porous film 5, a mixed solution containing a filler such as alumina or carboxymethyl cellulose.

Note that, in the coating step, an adhesive layer can be formed on the porous film 5, by applying a vinylidene polyfluoride or dimethyl acetoamide solution (coating solution) on the porous film 5 (application step) and coagulating the vinylidene polyfluoride or dimethyl acetoamide solution (coagulating step). The adhesive layer can be formed on a single surface of the porous film 5 or on both surfaces of the porous film 5.

A method of coating the porous film 5 with a coating solution is not specifically limited, provided that uniform wet coating can be carried out by the method. The method can be a conventionally well-known method such as a capillary coating method, a spin coating method, a slit die coating method, a spray coating method, a dip coating method, a roll coating method, a screen printing method, a flexo printing method, a bar coater method, a gravure coater method, or a die coater method. The heat-resistant layer 4 has a thickness which can be controlled by adjusting a thickness of a coating wet film or a solid-content concentration in the coating solution.

It is possible to use a resin film, a metal belt, a drum or the like as a support with which the porous film 5 is fixed or conveyed in coating.

It is thus possible to produce the separator 12 (heat-resistant separator) in which the heat-resistant layer 4 is stacked on the porous film 5. The separator thus produced is wound around a core having a cylindrical shape. Note that a subject to be produced by the above production method is not limited to the heat resistant separator. The above production method does not necessarily include the coating step. In a case where no coating step is included in the method, the subject to be produced is a separator having no heat-resistant layer. Alternatively, an adhesive separator having other functional layer (such as later-described adhesive layer), instead of the heat-resistant layer, can be produced by a production method similar to that of the heat-resistant separator.

(Slitting Apparatus)

The heat resistant separator or the separator including no heat resistant layer (hereinafter, referred to as "separator") preferably has a width (hereinafter, referred to as "product width") suitable for application products such as the lithium-ion secondary battery 1. Note, however, that the separator is produced so as to have a width that is equal to or larger than a product width, in view of an improvement in productivity. After the separator is once produced, the separator is slit into a separator(s) having the product width.

Note that the "separator width" means a length of the separator in a direction substantially perpendicular to a lengthwise direction and a thicknesswise direction of the separator. Hereinafter, a wide separator, which has not subjected to slitting, is referred to as an "original sheet," whereas particularly a separator which has been subjected to slitting is referred to as a "slit separator." Note also that (i) "slitting" means to slit the separator in the lengthwise direction (flow direction of the film during production; MD: Machine direction) and (ii) "cutting" means to slit the separator in a transverse direction (TD). Note that the transverse direction (TD) means a direction which is substantially perpendicular to the lengthwise direction (MD) and the thicknesswise direction of the separator.

Figure 4:
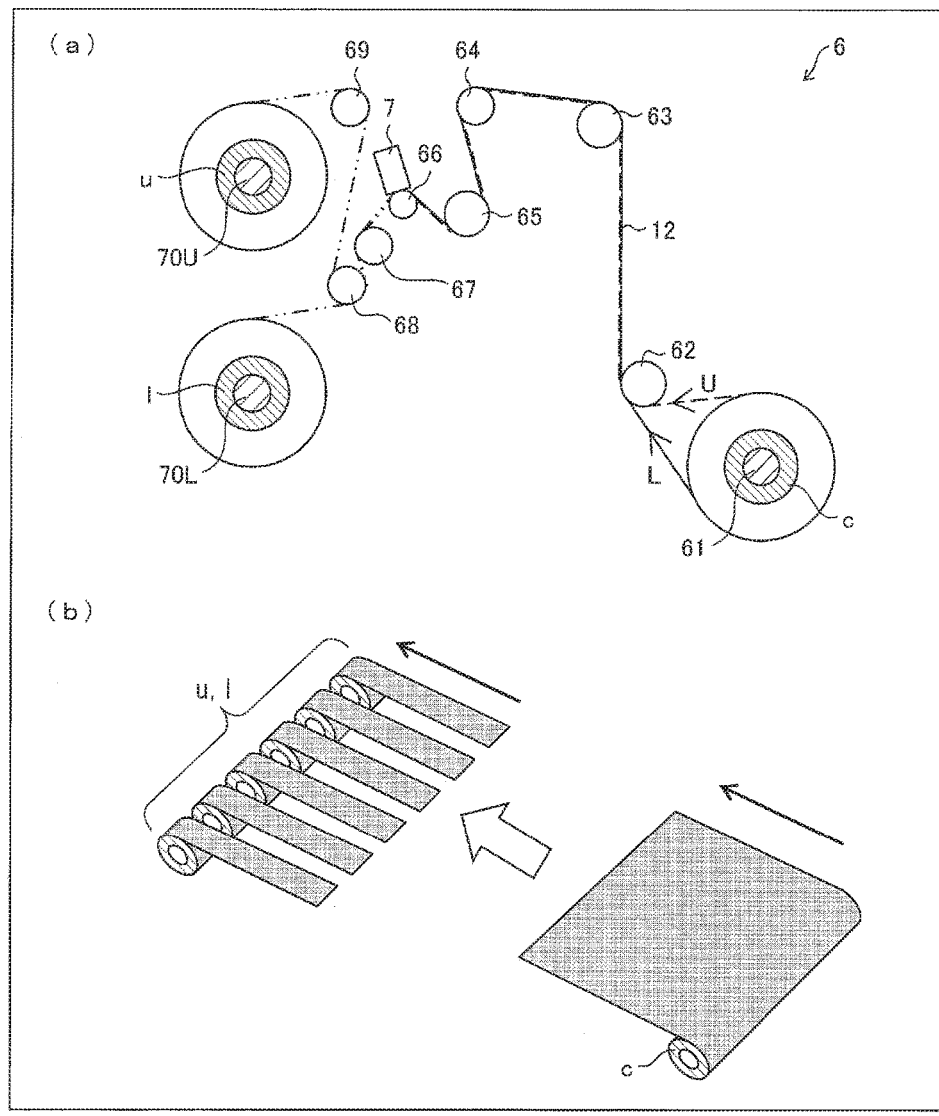
FIG. 4 is a schematic view illustrating a configuration of a slitting apparatus for slitting the separator.

FIG. 4 is a schematic view illustrating a configuration of a slitting apparatus 6 for slitting the separator. (a) of FIG. 4 illustrates an entire configuration, and (b) of FIG. 4 illustrates arrangements before and after slitting the original sheet. As illustrated in (a) of FIG. 4, the slitting apparatus 6 includes a rotatably-supported cylindrical wind-off roller 61, rollers 62 to 69, and take-up rollers 70U and 70L. The slitting apparatus 6 further includes cutting devices 7 described later.

(Before Slitting)

In the slitting apparatus 6, a cylindrical core c around which the original sheet is wrapped is fit on the wind-off roller 61. As illustrated in (b) of FIG. 4, the original sheet is wound off from the core c to a route U or L. The original sheet which has been thus wound off is conveyed to the roller 68, via the rollers 63 through 67. In the conveying step, the original sheet is slit into a plurality of slit separators. Note that the roller 67 is not necessarily provided. In such a case, the original sheet is conveyed from the roller 66 to the roller 68.

(After Slitting)

As illustrated in (b) of FIG. 4, some of the slit separators are wound around respective cylindrical cores u (bobbins), which are fit on the take-up roller 70U.

Meanwhile, the others of the plurality of slit separators are wound around respective cylindrical cores l (bobbins), which are fit on the take-up roller 70L. Note that (i) the slit separators each wound around in a roll manner and (ii) the respective cores u and l are, as a whole, referred to as a "roll".

(Cutting Device)

Figure 5:
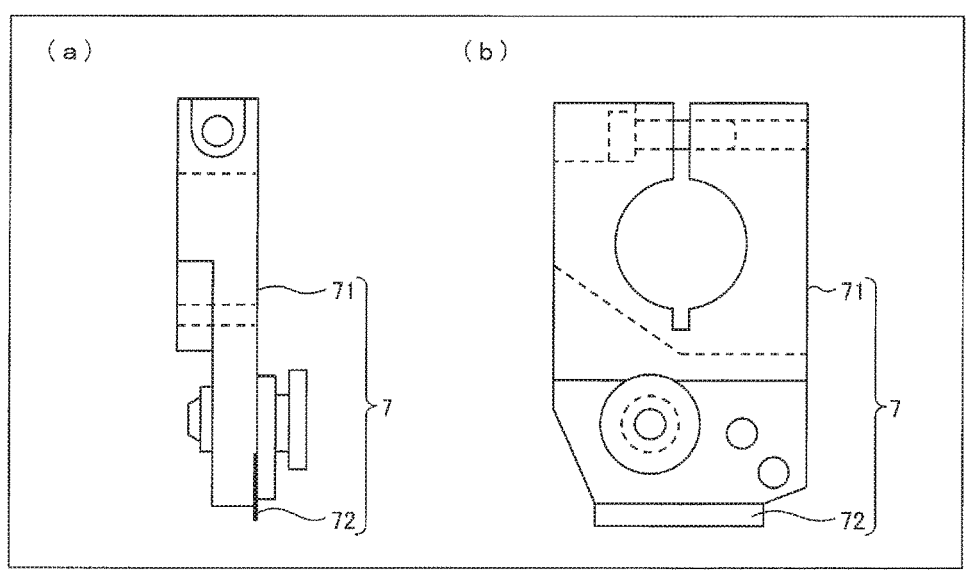
FIG. 5 is a view illustrating a configuration of each of cutting devices in the slitting apparatus illustrated in FIG. 4.

FIG. 5 is a view illustrating a configuration of each of the cutting devices 7 in the slitting apparatus 6 as illustrated in (a) of FIG. 4. (a) of FIG. 5 is a side view of the cutting device 7, and (b) of FIG. 5 is a front view of the cutting device 7. As illustrated in (a) and (b) of FIG. 5, each of the cutting devices 7 includes a holder 71 and a blade 72. The holder 71 is fixed to a housing or the like provided in the slitting apparatus 6. The holder 71 holds the blade 72 such that the blade 72 and original sheet of the separator being conveyed have a fixed positional relation. The blade 72 (i) has a finely sharpened edge and (ii) slits the original sheet of the separator by using the edge.

Embodiments

Configuration of Separator Roll

Figure 6:
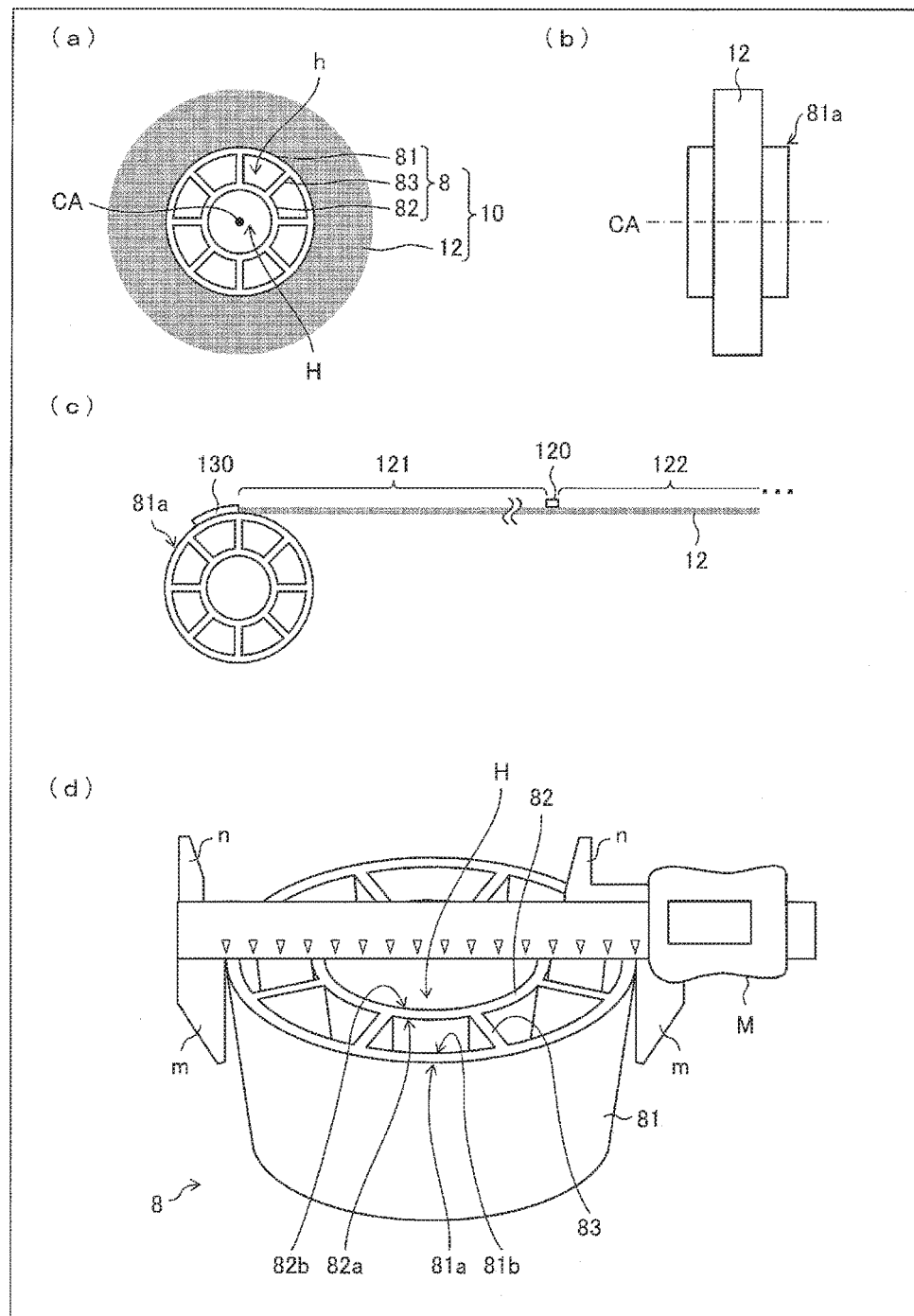
FIG. 6 is a view illustrating a configuration of a separator roll in accordance with an embodiment of the present invention.

FIG. 6 illustrates a configuration of a separator roll 10 in accordance with an embodiment of the present invention. (a) of FIG. 6 is a front view illustrating a state in which the separator 12 has not been wound off from the core 8. (b) of FIG. 6 is a side view of (a) of FIG. 6. (c) of FIG. 6 is a front view illustrating a state where the separator 12 has been wound off from the cure 8. (d) of FIG. 6 is a perspective view illustrating a state where the size of the core 8 is being measured. As illustrated in (a) and (b) of FIG. 6, the separator roll 10 includes the core 8 around which the separator 12 is wound. Note that the separator 12 has been obtained by slitting the original sheet as above.

(Core)

The core 8 includes an outer cylinder part 81, an inner cylinder part 82, and ribs 83 (support members), and has the same function as that of the cores u and l. The core 8 has an axis hole H whose center is a central axis CA of the core 8.

The outer cylinder part 81 is a cylindrical member having an outer circumferential surface 81a around which the separator 12 is wound. The inner cylinder part 82 is a cylindrical member which is provided inside the outer cylinder part 81 so as to surround the axis hole H. The ribs 83 are eight support members which are provided, at intervals, between the outer cylinder part 81 and the inner cylinder part 82 so as to support them. The core 8 has through holes h each surrounded by the outer cylinder part 81, the inner cylinder part 82, and the ribs 83.

Materials of the core 8 include an ABS resin. Note, however, that the materials of the core 8 of the present invention are not limited to the ABS resin but can alternatively include resins such as a polyethylene resin, a polypropylene resin, a polystyrene resin, and a vinyl chloride resin. It is preferable that the materials of the core do not include metal, paper, and a fluorine resin.

(Separator)

As illustrated in (c) of FIG. 6, there is provided, on an outer surface of the separator 12, a tape 120 which is a sign indicating an end part of a product. Such a tape is often employed as the sign indicating an end part of a product. Alternatively, a seal, a stamp, or a print can be employed as the sign. A surface of the separator 12 on which surface the tape 120 is provided is not limited to an outer surface of the separator 12. The tape can alternatively be provided on an inner surface of the separator 12.

The separator 12 is made up of (i) an inner circumferential part 121 located on a side closer to the core 8 than the tape 120 and (ii) an outer circumferential part 122 located on a side farther from the core 8 than the tape 120. An end of the separator 12 is attached to the core 8 by an adhesive tape 130 (fixing tape). Specifically, the end of the separator 12 is fixed to the outer circumferential surface 81a by the adhesive tape 130 having an adhesive agent. Alternatively, the end of the separator 12 can be fixed to the outer circumferential surface 81a by directly applying an adhesive agent to the end of the separator 12 or by a clip.

Unevenness of the outer circumferential surface 81a is transferred to the separator 12. Note that the unevenness is more easily transferred to the inner circumferential part 121 than to the outer circumferential part 122. Accordingly, in a case where the separator 12 is used as a component of a battery, the outer circumferential part 122 divided by the tape 120 is used. The inner circumferential part 121 has a length of 3 m. The inner circumferential part 121 of the present invention is not limited to have 3 m.

(Method of Measuring Size of Core)

As illustrated in (d) of FIG. 6, a diameter of the outer circumferential part 81 is measured by causing jaws m of a slide caliper M to contact the outer circumferential surface 81a of the outer cylinder part 81. A diameter of the axis hole H is measured by causing jaws n of the slide caliper M to contact an inner circumferential surface 82b of the inner cylinder part 82. A length of the rib 83 in a radial direction of the core 8 is measured by causing (i) one of the jaws n of the slide caliper M to contact an inner circumferential surface 81b of the outer cylinder part 81 and (ii) the other of the jaws n to contact an outer circumferential surface 82a of the inner cylinder part 82.

(Inclination of Core Required when Separator is Wound Around the Core)

Figure 7:
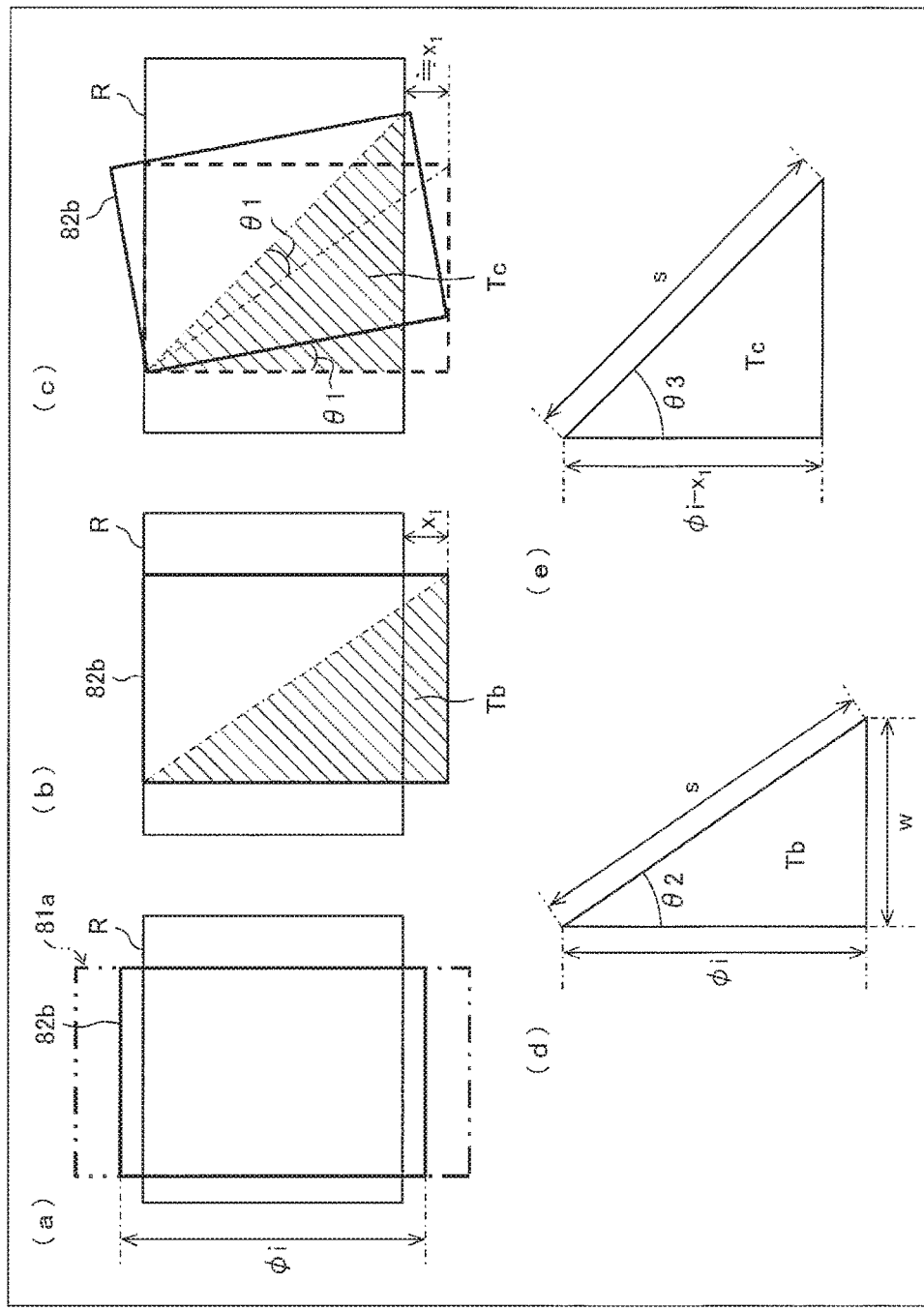
FIG. 7 is a side view illustrating a state where a take-up roller is inserted into an axis hole of a core of the separator roll illustrated in FIG. 6.

FIG. 7 is a side view illustrating a state where a take-up roller R is inserted into the axis hole H of the core 8 of the separator roll 10 illustrated in FIG. 6. (a) of FIG. 7 illustrates a state where the core 8 is fixed to the take-up roller R without being inclined. (b) of FIG. 7 illustrates a state where the core 8 is not yet fixed to the take-up roller R. (c) of FIG. 7 illustrates a state where the core 8 is fixed, at a slant, to the take-up roller R. (d) and (e) of FIG. 7 illustrate sizes and angles for calculating an angle of inclination of the core 8. Note, in FIG. 7, that, only the inner circumferential surface 82b of the inner cylinder part 82 of the separator roll 10 and the take-up roller R are indicated by full lines, for clarity of the drawing.

The take-up roller R includes a surface-protruding mechanism. In the mechanism, (i) the take-up roller R causes its surface to thrust towards and press against the inner circumferential surface 82b of the inner cylinder part 82 of the core 8. This allows a certain frictional force to be applied to the internal circumferential surface 82b, and ultimately causes a rotating force of the take-up roller R to be conveyed to the inner circumferential surface 82b. The take-up roller R has the same function as the take-up rollers 70U and 70L. As illustrated in (a) of FIG. 7, the core 8 is fixed to the take-up roller R without being inclined while the surface-protruding mechanism is normally operating. The rotation of the take-up roller R causes the core 8 to rotate, and ultimately causes the separator 12 to be wound around the outer circumferential surface 81a of the outer cylinder part 81 of the core 8.

As illustrated in (b) of FIG. 7, while the surface-protruding mechanism is not being effective, the core 8 drops vertically downward by gravitation. Note that a gap length $x_1$ is a maximum length of a gap between the inner circumferential surface 82b and the take-up roller R.

As illustrated in (c) of FIG. 7, while the surface-protruding mechanism is not entirely effective but is partially effective, the core 8 can be fixed, at a slant, to the take-up roller R. An inclination angle θ1 refers to an angle by which the core 8 is inclined from the inner circumferential surface 82b (broken line) illustrated in (b) of FIG. 7. The maximum length of the gap between the inner circumferential surface 82b and the take-up roller R is substantially equal to the gap length $x_1$ illustrated in (b) of FIG. 7. The gap length $x_1$ is set to approximately 1 mm, in a case where the core 8 is attached to or detached from the take-up roller R. Due to an error in mechanical accuracy of the surface-protruding mechanism, 0.2 mm out of the gap length $x_1$ of 1 mm (0.2 mm corresponds to x (gap length constant) in the above Formula [1]) contributes to the inclination of the core 8.

(Angle of Inclination of Core)

A triangle Tb illustrated in (d) of FIG. 7 is obtained by dividing a rectangle by its diagonal line, which rectangle is obtained when the core 8, illustrated in (b) of FIG. 7, is viewed from a side thereof. A size and an angle of the triangle Tb can be expressed by Equations (1) and (2) below. An angle θ2 is an angle of a vertex of the triangle Tb which vertex is on a side where the inner circumferential surface 82b contacts the take-up roller R in (b) of FIG. 7.

$$s=(w^2+\varphi i^2)^{1/2} \tag{1}$$

$$\cos\theta 2=\varphi i/s \tag{2}$$

Equation (3) is derived from Equations (1) and (2).

$$\theta 2=\cos^{-1}(\varphi i/(w^2+\varphi i^2)^{1/2}) \tag{3}$$

φi: diameter of inner circumferential surface 82b (diameter of axis hole H) [mm]
w: width of core 8 in central axis direction A triangle Tc illustrated in (e) of FIG. 7 is obtained by dividing a rectangle by its diagonal line, which rectangle is obtained when the core 8, illustrated in (c) of FIG. 7, is viewed from a side thereof. A size and an angle of the triangle Tc can be expressed by Equation (4) below, similarly with Equation (3). An angle θ3 is an angle of a vertex of the triangle Tc which vertex is on a side where the inner circumferential surface 82b contacts the take-up roller R and from which vertex inclination of the core 8 starts.

$$\theta 3=\cos^{-1}((\varphi i-x)/(w^2+\varphi i^2)^{1/2}) \tag{4}$$

At that time, a relation between the inclination angle θ1 and the angles θ2 and θ3 can be expressed by Equation (5) below.

$$\theta 1=\theta 3-\theta 2 \tag{5}$$

By substituting Equations (3) and (4) for θ2 and θ3 in Equation (5), Equation (6) below can be derived.

$$\theta 1=\cos^{-1}((\varphi i-x)/(w^2+\varphi i^2)^{1/2})-\cos^{-1}(\varphi i/(w^2+\varphi i^2)^{1/2}) \tag{6}$$

(Width of Meandering of Separator 12)

Figure 8:
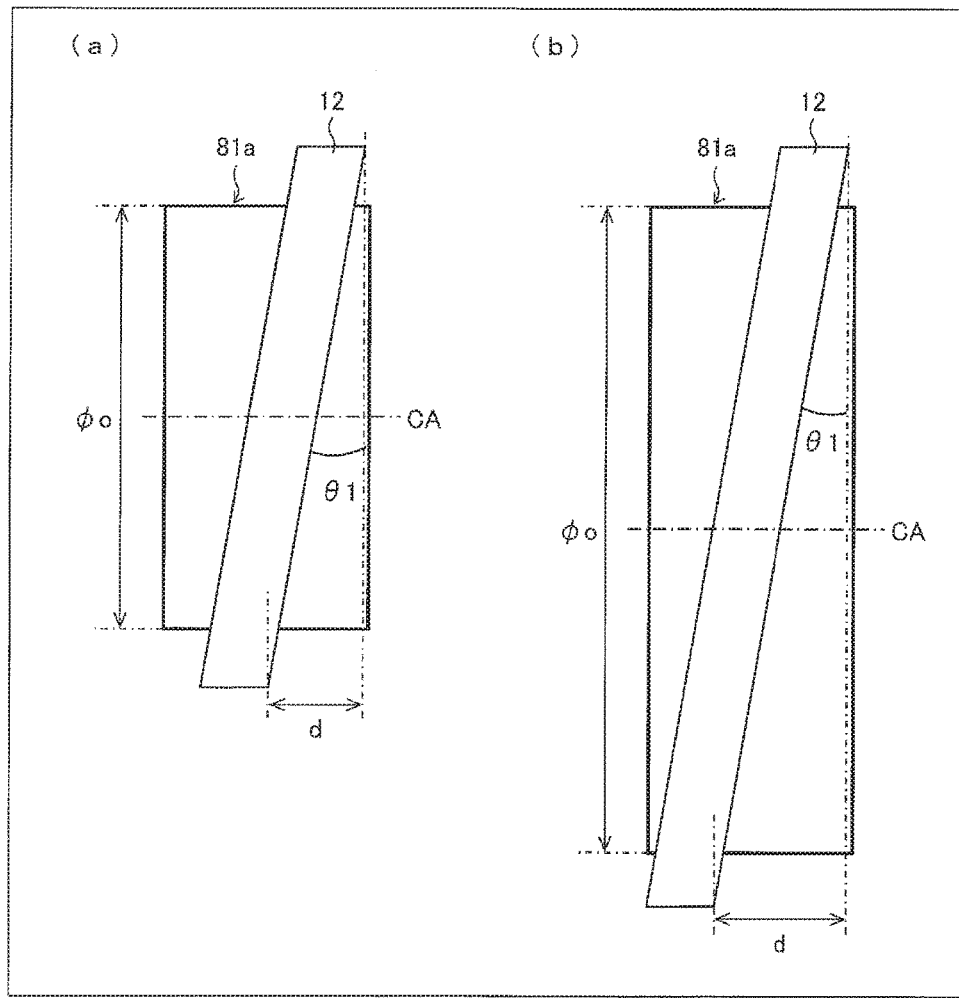
FIG. 8 is a side view illustrating a state of the separator roll obtained when a separator is wound around the core in the state illustrated in FIG. 7.

FIG. 8 is a side view illustrating a state of the separator roll 10 obtained when the separator 12 is wound around the core 8 in the state illustrated in (c) of FIG. 7. (a) of FIG. 8 illustrates a state where the diameter of the outer circumferential surface 81a of the outer cylinder part 81 of the core 8 is relatively small. (b) of FIG. 8 illustrates a state where the diameter is relatively large. As illustrated in (a) of FIG. 8, in a case where the separator 12 is wound around the core 8 in the state illustrated in (c) of FIG. 7, the separator 12 is inclined from a direction perpendicular to the central axis CA of the core 8. A position at which the separator 12 is wound off from the separator roll 10 in such a state varies within a range defined by a meandering width d. The meandering width d can be expressed by Equation (7) below.

$$d=(2nt+\varphi o)\tan\theta 1 \tag{7}$$

n: number of winding of separator 12
t: thickness of separator 12 [μm]
φo: diameter of outer circumferential surface 81a (diameter of core 8) [mm]

The number n of winding of the separator 12 can be expressed by Equation (8) below.

$$n=(\varphi f-\varphi o)/2t \tag{8}$$

φf: diameter of separator roll 10 [mm]

Figure 9:
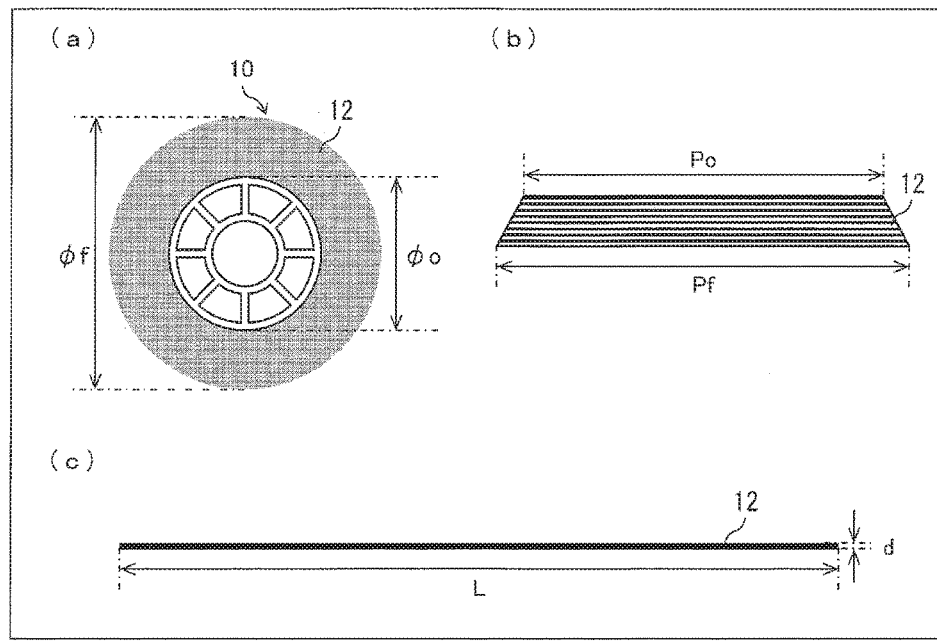
FIG. 9 is a front view describing a method of calculating an outer diameter of the separator roll illustrated in FIG. 6.

FIG. 9 is a front view describing a method of calculating the diameter φf of the separator roll 10 illustrated in (a) of FIG. 6. (a) of FIG. 9 illustrates a state where the separator 12 having a length L is wound around the core 8. (b) of FIG. 9 illustrates a state where the separator 12, wound around the core 8, is cut in a radial direction of the core 8 so as to be flattened out. (c) of FIG. 9 illustrates a state where the separator 12, wound around the core 8, is flattened out without being cut.

As illustrated in (b) of FIG. 9, in a case where the separator 12, wound around the core 8, is cut in a radial direction of the core 8 so as to be flattened out, the separator 12 is substantially a trapezoid when viewed from a side thereof. A short side Po of the trapezoid can be expressed as "πφo", a long side Pf of the trapezoid can be expressed as "πφf", and a height of the trapezoid can be expressed as "(φf−φo)/2". Accordingly, an area of the trapezoid can be expressed as "π(φf+φo) (φf−φo)/4".

As illustrated in (c) of FIG. 9, in a case where the separator 12, wound around the core 8, is flattened out without being cut, the separator 12 is substantially an extremely elongated rectangle when viewed from a side thereof. An area of the rectangle can be expressed as "dL".

Since the area of the rectangle and the area of the trapezoid are equal to each other, Equation (9) below can be derived.

$$dL=\pi(\varphi f+\varphi o)(\varphi f-\varphi o)/4 \tag{9}$$

Equation (10) below can be derived from Equation (9).

$$\varphi f=(4dL/\pi+\varphi o^2)^{1/2} \tag{10}$$

As is clear from Equation (7), the meandering width d becomes smaller as the inclination angle θ1 becomes smaller. As is clear from (b) of FIG. 8, the meandering width d becomes larger as the diameter φo becomes larger. By substituting Equation (6) in Equation (7), Equation (11) below can be derived.

$$d=(2nt+\varphi o)\tan(\cos^{-1}((\varphi i-x)/(w^2+\varphi i^2)^{1/2})-\cos^{-1}(\varphi i/(w^2+\varphi i^2)^{1/2})) \tag{11}$$

(Conditions for Reducing Meandering Width)

TABLE 1

| | Symbol | Unit | Ex. 1 | Ex. 2 | Ex. 3 | Ex. 4 | Ex. 5 | Ex. 6 | Ex. 7 | Ex. 8 | Com. Ex. 1 | Com. Ex. 2 | Com. Ex. 3 |
|---|---|---|---|---|---|---|---|---|---|---|---|---|---|
| Diameter of core | φo | mm | 152 | 102 | 123 | 95 | 100 | 123 | 123 | 123 | 200 | 200 | 125 |
| Diameter of axis hole of core | φi | mm | 75 | 75 | 75 | 75 | 75 | 75 | 75 | 75 | 75 | 75 | 75 |
| Width of core | w | mm | 65 | 85 | 65 | 65 | 60 | 65 | 65 | 65 | 60 | 50 | 30 |
| Gap length | x | mm | 0.2 | 0.2 | 0.2 | 0.2 | 0.2 | 0.2 | 0.2 | 0.2 | 0.2 | 0.2 | 0.2 |

TABLE 1-continued

| | Symbol | Unit | Ex. 1 | Ex. 2 | Ex. 3 | Ex. 4 | Ex. 5 | Ex. 6 | Ex. 7 | Ex. 8 | Com. Ex. 1 | Com. Ex. 2 | Com. Ex. 3 |
|---|---|---|---|---|---|---|---|---|---|---|---|---|---|
| constant | | | | | | | | | | | | | |
| Thickness of separator | t | μm | 16 | 16 | 16 | 16 | 16 | 20 | 12 | 20 | 16 | 16 | 16 |
| Length of separator | L | m | 2500 | 2500 | 2500 | 2500 | 2500 | 1500 | 1500 | 400 | 2500 | 2500 | 2500 |
| Diameter of separator roll | φf | mm | 272 | 248 | 257 | 245 | 247 | 231 | 195 | 159 | 302 | 302 | 258 |
| Number of times of windings of separator | n | | 3753 | 4552 | 4188 | 4683 | 4589 | 2698 | 3002 | 903 | 3173 | 3173 | 4156 |
| Inclination angle of core | θ1 | | 0.18 | 0.13 | 0.18 | 0.18 | 0.19 | 0.18 | 0.18 | 0.18 | 0.19 | 0.23 | 0.38 |
| Meandering width of separator | d | mm | 0.84 | 0.58 | 0.79 | 0.75 | 0.82 | 0.71 | 0.60 | 0.49 | 1.00 | 1.20 | 1.71 |
| Diameter ratio | φo/φi | | 2.03 | 1.36 | 1.64 | 1.27 | 1.33 | 1.64 | 1.64 | 1.64 | 2.67 | 2.67 | 1.67 |
| Diameter difference | φo − φi | mm | 77 | 27 | 48 | 20 | 25 | 48 | 48 | 48 | 125 | 125 | 50 |
| Diameter difference/width of core | (φo − φi)/w | | 1.2 | 0.3 | 0.7 | 0.3 | 0.4 | 0.7 | 0.7 | 0.7 | 2.1 | 2.5 | 1.7 |
| diameter of separator roll/ diameter of axis hole of core | φf/φi | | 3.6 | 3.3 | 3.4 | 3.3 | 3.3 | 3.1 | 2.6 | 2.1 | 4.0 | 4.0 | 3.4 |

Ex. stands for Example.
Com. Ex. stands for Comparative Example.

Table 1 shows the result of calculation of the meandering width d expressed by Equation (11) with respect to each of various separator rolls 10.

The inventors of the present invention have sought conditions for restraining the meandering width d expressed by Equation (11) with respect to each of various separator rolls 10, and found that when the later-described conditions are met, it is possible to remarkably restrain a width by which the separator 12 meanders (hereinafter "meandering width").

[First Condition]

As shown in Table 1, Examples 1 through 8 meet a condition that a value $((\varphi o-\varphi i)/w)$ obtained by dividing a diameter difference $(\varphi o-\varphi i)$ by the width w of the core 8 is not less than 0.3 and not more than 1.5 (first condition). According to Examples 1 through 8, the meandering width d falls within a range of less than 1.00 mm. As above, meeting of the first condition allows the meandering width d to be restrained, as compared with conventional separator rolls (e.g. those in Comparative Examples 1 through 3). The value $((\varphi o-\varphi i)/w)$ is preferably not less than 0.3 and not more than 1.2. In this case, the meandering width d falls within a range of not more than 0.84 mm. The value $((\varphi o-\varphi i)/w)$ is more preferably not less than 0.3 and not more than 0.7. In this case, the meandering width d is in a range of not more than 0.82 mm.

[Technical Significance of First Condition]

As the difference between the diameter φo and the diameter φi becomes larger, the meandering width d becomes larger. As the core width becomes smaller, the meandering width d becomes larger. When the value $((\varphi o-\varphi i)/w)$ is more than 1.5, a reduction in core width gives rise to a greater contribution to an increase in meandering width. This can cause the separator 12 to meander to such an extent that a separator roll including the separator 12 is not acceptable as a battery separator. When the value $((\varphi o-\varphi i)/w)$ is less than 0.3, meandering is not adversely affected but a wide core is forced to be supported by a small gap. This gives rise to a significant difficulty in handling the core. In a case where the separator roll 10 meets the first condition, such problems can be solved.

[Second Condition]

Specifically, Examples 2 through 8 meet a condition that the diameter φo is less than 125 mm and a diameter ratio (φo/φi) is not less than 1.25 and not more than 1.65 (second condition). According to Examples 2 through 8, the meandering width d falls within a range of less than 1.00 mm. As above, meeting of the second condition allows the meandering width d to be restrained, as compared with conventional separator rolls (e.g. those in Comparative Examples 1 through 3). The diameter ratio (φo/φi) is preferably not less than 1.27 and not more than 1.64. When the diameter ratio (φo/φi) is in this range, the meandering width d is in a range of not more than 0.82 mm. Furthermore, the separator roll 10 meeting both the first and second conditions is encompassed in the present invention.

[Technical Significance of Second Condition]

In a case where the diameter φo is not less than 125 mm, there is a possibility that the separator roll 10 is difficult to convey. In a case where the diameter ratio (φo/φi) is less than 1.25, the outer cylinder part 81 and the inner cylinder part 82 come close to each other. This causes a lateral area of the core 8 to be reduced. In such a case, there is a possibility that, while conveying the separator roll 10, a part of a conveyer, human's finger etc. will contact not only a side surface of the core 8 but also a side surface of the separator 12 wound around the core 8. This can cause a reduction in quality of the separator roll 10. In a case where the diameter ratio (φo/φi) is more than 1.65, there is a possibility that the separator 12 meanders to such an extent that a separator roll including the separator 12 is not acceptable as a battery separator. In a case where the separator roll 10 meets the second condition, these problems can be solved.

(Stability in Winding Up and Winding Off)

The separator 12 is taken up while the separator 12 is being tensioned so as to prevent occurrence of wrinkles.

This requires a frictional force between the inner cylinder part 82 of the core 8 and the take-up roller R which frictional force matches the tension applied to the separator 12. Moments acting on objects having respective concentric shapes are proportional to radii of the respective concentric shapes. Accordingly, in a case where a force (tension) applied to an outermost periphery is constant, the moment becomes larger as the radius becomes larger. Therefore, the frictional force between the inner cylinder part 82 of the core 8 and the take-up roller R which frictional force matches the tension is proportional to a radius of the separator roll 10 (hereinafter "roll radius"). In a case where the roll radius becomes larger, it is necessary to heighten the effect of the surface-protruding mechanism in order that the tension and the frictional force match each other. This can cause (i) the core 8 to deform or deteriorate and (ii) malfunction of the surface-protruding mechanism because of an excessive load on the surface-protruding mechanism.

Also in a case where the separator 12 is wound off from the separator roll 10, it is necessary to generate a frictional force which matches a tension for winding off the separator 12. Specifically, the frictional force is required to be larger as the roll radius is larger.

[Third Condition]

The inventors of the present invention have found that it is possible to reduce a load on the surface-protruding mechanism, by meeting (i) the first or second condition and (ii) a condition that a value ($\varphi f/\varphi i$), obtained by dividing the diameter $\varphi f$ of the separator roll 10 by the diameter $\varphi i$, is not less than 2.3 and not more than 3.5. Note that $\varphi f=(2nt+\varphi o)$.

[Technical Significance of Third Condition]

As the diameter $\varphi f$ becomes larger, the tension and the frictional force, which should match each other at the center of the separator roll 10, become larger. As the diameter $\varphi i$ becomes smaller, the tension and the frictional force, which should match each other at the center of the separator roll 10, become larger. In a case where the value ($\varphi f/\varphi i$) is more than 3.5, there is a possibility that it is impossible to stably take up or wind off the battery separator. In a case where the value ($\varphi f/\varphi i$) is less than 2.3, the frictional force is not adversely affected, but the length of the separator which can be taken up becomes extremely short. This requires frequently switching the separator rolls 10 during manufacturing of a battery (i.e., a battery using the separator 12 wound off from the separator roll 10). In this regard, the separator roll in Example 8 is not preferable as a separator roll for a battery separator. Note, however, that in a case where the separator roll 10 meets the third condition, the above problems can be solved. Since this stabilizes taking up and winding off of the separator 12, it is possible to restrain the meandering width as compared with conventional separator rolls.

<Effects of the Present Embodiment>

The separator roll 10, which meets the above conditions for restraining the meandering width, allows the meandering width d to be restrained as compared with conventional separator rolls. A device for correcting meandering of a battery separator (EPC device; Edge Position Control device) can correct a meandering width of approximately 1 mm at maximum. As such, the meandering width of the separator roll 10 can be corrected by such an EPC device. Specifically, the meandering width d of the separator roll 10 is preferably less than 1.00 mm, and more preferably not more than 0.80 mm.

(Stability of Roll)

If the separator 12 is wound around the core 8 and the diameter of the core 8 is less than 125 mm, then the number of windings of the separator 12 becomes larger, as compared with a conventional core. In a case where the number of windings becomes larger the separator 12 is wound around the core 8 firmly particularly at a portion closer to the core 8. In view of the circumstances, in a case where the diameter of the core is less than 125 mm, winding offset (phenomenon in which winding of the separator roll 10 is misaligned like a bamboo shoot due to lateral impact) is less likely to occur. This can provide a separator roll resistant to lateral impact.

(Reformation of Curl of Separator)

In a case where the separator 12 is wound around the core 8 whose diameter is less than 125 mm, a curve (curvature) of an outer circumferential surface of the core 8 becomes tighter (larger) than that of a conventional core. In a case where the separator 12 is a stacking member made up of a front surface and a rear surface containing respective different materials, there is a possibility that warpage called "curl" appears due to a difference, in physical property, between the front surface and the rear surface. One of methods of reforming the curl is to (i) apply a force to the separator 12 in a desirable direction (normally in a direction opposite to a direction in which warpage appears due to the difference in physical property) and (ii) fix the separator 12 so that a resin constituting the separator 12 is plastically deformed. In a case where the diameter of the core 8 is less than 125 mm, the curve of the separator 12 wound around the core 8 is tight. Accordingly, in a case where the separator 12 is wound off from the core 8, it is possible to easily reform the curl so as to make the curl small.

(Easiness in Conveyance)

As illustrated in FIG. 6, the core 8 of the separator roll 10 has the plurality of through holes h each of which is a gap surrounded by the outer cylinder part 81, the inner cylinder part 82, and the ribs 83. In a case where each length, in a radial direction of the core 8, of the plurality of through holes h is not less than 5 mm, the separator roll 10 can be easily conveyed. This is because the separator roll 10 can be easily conveyed by inserting a part of a movable body (conveyer, human's finger etc.) into the gap(s).

(Weight Saving)

Since the core 8 is smaller in diameter than a conventional core, the separator roll 10 is lighter in weight than a conventional separator roll. Furthermore, since the core 8 is smaller in diameter, the core 8 can achieve a strength similar to that of conventional one although the core 8 has a thickness smaller than the conventional one. This allows the separator roll 10 to be further lighter in weight. Furthermore, a separator can be employed as the separator 12, which separator (i) contains, for example, an inorganic compound with a specific gravity of 2.0 g/cm$^2$ or more and (ii) is heavier in weight than a conventional battery separator.

(Absorption of Unevenness)

Figure 10:
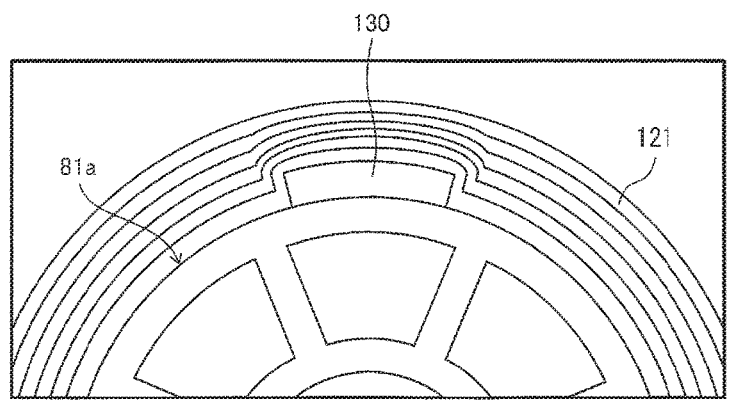
FIG. 10 is an enlarged view illustrating an adhesive tape and portions near the adhesive tape in the separator roll illustrated in FIG. 6.

FIG. 10 is an enlarged view illustrating the adhesive tape 130 and portions near the adhesive tape 130 in the separator roll 10 illustrated in FIG. 6. As illustrated in FIG. 10, an end of the inner circumferential part 121 of the separator 12 is attached to the outer circumferential surface 81a of the core 8, via the adhesive tape 130. Since the inner circumferential part 121 is wound around the core 8 so as to cover the adhesive tape 130, the inner circumferential part 121 partially has unevenness.

As illustrated in FIGS. 2 and 3, the separator 12 has innumerable pores as the pores P. Consequently, the separator 12 can be supposed to be crushable, in a thickness direction, depending on a porosity, in a case where a force is applied to the separator 12 in the thickness direction. For example, assume that the separator 12 has a thickness of 13

μm and a porosity of 50%. On that assumption, the separator 12, wound around the core 8, can reduce its thickness by approximately 50 μm per eight layers of the separator 12. Accordingly, as the separator 12, wound around the core 8, is farther from the outer circumferential surface 81a (as the number of windings of the inner circumferential part 121 increases), unevenness of the separator 12, caused by the adhesive tape 130, is absorbed by a decrease in thickness of the separator 12, i.e., is reduced.

Specifically, in a case where the diameter of the core 8 is, for example, 6 inches, the length of the inner circumferential part 121, wound around the core 8 eight times, is approximately 3.8 m. In a case where the diameter of the core 8 is 5 inches, the length of the inner circumferential part 121, wound around the core 8 eight times, is approximately 3.2 m. As the core 8 becomes smaller in diameter, the number of windings of the inner circumferential part 121 can increase. As has been described, since the core 8 of the separator roll 10 is smaller in diameter than a conventional core, it is possible to increase the number of windings of the inner circumferential part 121, as compared with the conventional separator roll 10. Besides, the unevenness of the separator 12, caused by the adhesive tape 130, can be more absorbed by a decrease in thickness of the separator 12 as compared with conventional separator rolls. It is therefore possible to use the adhesive tape 130 whose thickness is larger (e.g. thickness of not less than 20 μm and not more than 100 μm) than a conventional one.

(Method of Producing Separator Roll)

A method of producing the separator roll 10 is also encompassed within the scope of the present invention. The method includes the steps of (i) inserting a take-up roller R into an axis hole H and fixing the core 8 to the take-up roller R as illustrated in FIG. 7 and (ii) winding the separator 12 around the core 8 (cores u and l in FIG. 4) while rotating the core 8 along with the take-up roller R (take-up rollers 70U and 70L in FIG. 4) as illustrated in FIG. 4.

Furthermore, in the method, by setting the parameters below so that the value of Equation (11) above becomes less than 1.00 mm, it is possible to produce the separator roll 10 (e.g. separator rolls in Examples 1 through 8) whose meandering width d is less than 1.00 mm.

n: number of times by which the separator 12 is wound around the core 8 t [μm]: average thickness of the separator 12

$\varphi o$ [mm]: diameter of the core 8

$\varphi i$ [mm]: diameter of the axis hole H x (0.2 mm): gap length constant w [mm]: width of the core 8

Furthermore, it is preferable to set the above parameters so that the value of Equation (11) is not more than 0.80 mm. This allows for a production of the separator roll 10 whose meandering width d is not more than 0.80 mm.

[Summary]

A separator roll of the present invention is a separator roll, including: a core; and a battery separator wound around the core, the core having an axis hole along a central axis of the core, a value being not less than 0.3 and not more than 1.5, the value being obtained by dividing, by a width of the core in a direction of the central axis, a difference between a diameter of the core and a diameter of the axis hole.

The inventors of the present invention have found that when a value obtained by dividing a difference between a diameter of the core and a diameter of the axis hole by a width of the core in a direction of the central axis is within a specific range smaller than that of a conventional core, it is possible to greatly reduce a width by which the battery separator meanders (hereinafter "meandering width"). With the above arrangement, it is possible to reduce a meandering width as compared with a conventional separator roll.

The separator roll of the present invention may be arranged such that the core has a diameter of less than 125 mm, and a diameter ratio, obtained by dividing the diameter of the core by the diameter of the axis hole, is not less than 1.25 and not more than 1.65.

A separator roll of the present invention is a separator roll, including: a core; and a battery separator wound around the core, the core having an axis hole along a central axis of the core, the core having a diameter of less than 125 mm, a diameter ratio, obtained by dividing the diameter of the core by a diameter of the axis hole, being not less than 1.25 and not more than 1.65.

The inventors of the present invention have found that when a diameter ratio obtained by dividing a diameter of the core by a diameter of the axis hole is within a specific range smaller than that of a conventional core, it is possible to greatly reduce a meandering width. With the above arrangement, it is possible to reduce a meandering width as compared with a conventional separator roll.

The separator roll of the present invention may be arranged such that a value, obtained by dividing a diameter of the separator roll by the diameter of the axis hole of the core, is not less than 2.3 and not more than 3.5.

The inventors of the present invention have found that when a value obtained by dividing a diameter of the separator roll by a diameter of the axis hole of the core is within a specific range, it is possible to reduce a load on a surface-protruding mechanism which applies a certain frictional force to the core and transmits to the core a rotating force of a take-up roller that is rotating. With the above arrangement, the load on the surface-protruding mechanism can be reduced, so that deformation or deterioration of the core can be prevented. This stabilizes winding up and winding off of the separator, thereby further reducing a meandering width as compared with a conventional separator roll.

The separator roll of the present invention may be arranged such that the core includes: an outer cylinder part, an inner cylinder part provided inside the outer cylinder part, the inner cylinder part surrounding the axis hole extending along the central axis of the core, and a plurality of support members provided, at intervals, between the outer cylinder part and the inner cylinder part so as to support them, the plurality of support members each having a length of 5 mm or more in a radial direction of the core.

With the arrangement, the core has gaps each surrounded by the outer cylinder part, the inner cylinder part, and the support members. The gap has a length of 5 mm or more in a radial direction of the core. Consequently, by inserting a part of a conveyer, human's finger etc. into the gap(s), it is possible to easily convey the separator roll.

A method of the present invention of producing a separator roll is a method of producing a separator roll, the separator roll including a core and a battery separator wound around the core, the core having an axis hole along a central axis of the core, a value being not less than 0.3 and not more than 1.5, the value being obtained by dividing, by a width of the core in a direction of the central axis, a difference between a diameter of the core and a diameter of the axis hole, the method comprising the steps of: inserting a take-up roller into the axis hole and fixing the core to the take-up roller; and winding the battery separator around the core while rotating the core along with the take-up roller.

With the method, it is possible to produce a separator roll whose meandering width is smaller than that of a conventional separator roll.

A method of the present invention of producing a separator roll is a method of producing a separator roll, the separator roll including a core and a battery separator wound around the core, the core having an axis hole along a central axis of the core, the core having a diameter of less than 125 mm, a diameter ratio, obtained by dividing the diameter of the core by a diameter of the axis hole, being not less than 1.25 and not more than 1.65, the method comprising the steps of: inserting a take-up roller into the axis hole and fixing the core to the take-up roller; and winding the battery separator around the core while rotating the core along with the take-up roller.

With the method, it is possible to produce a separator roll whose meandering width is smaller than that of a conventional separator roll.

A method of the present invention of producing a separator roll is a method of producing a separator roll, the separator roll including a core and a battery separator wound around the core, the core having an axis hole along a central axis of the core, the method comprising the steps of: inserting a take-up roller into the axis hole and fixing the core to the take-up roller; and winding the battery separator around the core while rotating the core along with the take-up roller, a length represented by Formula [1] below being less than 1.00 mm.

$$(2nt+\varphi o)\tan(\cos^{-1}((\varphi i-x)/(w^2+\varphi i^2)^{1/2})-\cos^{-1}(\varphi i/(w^2+\varphi i^2)^{1/2})) \quad [1]$$

where n is the number of times by which the battery separator is wound around the core, t is an average thickness of the battery separator [μm], φo is a diameter of the core [mm], φi is a diameter of the axis hole [mm], x is 0.2 mm, and w is a width of the core in a direction of the central axis [mm].

With the arrangement, the value represented by the Formula [1] indicates a meandering width. Thus, it is possible to produce a separator roll whose meandering width is smaller than that of a conventional separator roll.

The method of the present invention may be arranged such that the length represented by the Formula [1] is not more than 0.80 mm.

With the method, it is possible to produce a separator roll whose meandering width is further smaller than that of a conventional separator roll.

[Additional Matter]

The present invention is not limited to the embodiments, but can be altered by a skilled person in the art within the scope of the claims. An embodiment derived from a proper combination of technical means each disclosed in a different embodiment is also encompassed in the technical scope of the present invention.

INDUSTRIAL APPLICABILITY

The present invention is applicable to a battery separator and a method of producing the battery separator and to a film other than a battery separator and a method of producing the film.

REFERENCE SIGNS LIST

8, u, 1 Core
10 Separator roll
70U, 70L, R Take-up roller
81 Outer cylinder part
81a Outer circumferential surface
82 Inner cylinder part
83 Rib (support member)
130 Adhesive tape (fixing tape)
CA Central axis
H Axis hole
n number of times of windings
φo Diameter of core
φi Diameter of axis hole of core

The invention claimed is:

1. A separator roll, comprising:
   a core; and
   a battery separator wound around the core,
   the core having an axis hole along a central axis of the core,
   a take-up roller extending through the axis hole,
   the take-up roller having a diameter that is smaller than the diameter of the axis hole,
   the battery separator having a meandering width less than 1.00 mm,
   wherein a value obtained by dividing a difference between a diameter of the core and the diameter of the axis hole by a width of the core in the direction of the central axis is not less than 0.3 and not more than 1.5,
   wherein the core has a diameter of less than 125 mm, and
   wherein a diameter ratio obtained by dividing the diameter of the core by the diameter of the axis hole is not less than 1.25 and not more than 1.33.

2. The separator roll as set forth in claim 1, wherein a value obtained by dividing a diameter of the separator roll by the diameter of the axis hole of the core is not less than 2.3 and not more than 3.5.

3. The separator roll as set forth in claim 1, wherein the core includes:
   an outer cylinder part,
   an inner cylinder part provided inside the outer cylinder part, the inner cylinder part surrounding the axis hole extending along the central axis of the core, and
   a plurality of support members provided, at intervals, between the outer cylinder part and the inner cylinder part so as to support them, the plurality of support members each having a length of 5 mm or more in a radial direction of the core.

4. A separator roll, comprising:
   a core; and
   a battery separator wound around the core,
   the core having an axis hole along a central axis of the core,
   a take-up roller extending through the axis hole,
   the take-up roller having a diameter that is smaller than the diameter of the axis hole,
   the battery separator having a meandering width less than 1.00 mm,
   wherein the core has a diameter of less than 125 mm, and
   wherein a diameter ratio obtained by dividing the diameter of the core by the diameter of the axis hole is not less than 1.25 and not more than 1.33.

5. A method of producing a separator roll,
   the separator roll including a core and a battery separator wound around the core,
   the core having an axis hole along a central axis of the core,
   wherein a value obtained by dividing a difference between a diameter of the core and a diameter of the axis hole by a width of the core in the direction of the central axis is not less than 0.3 and not more than 1.5,
the core has a diameter of less than 125 mm, and
a diameter ratio obtained by dividing the diameter of the core by the diameter of the axis hole is not less than 1.25 and not more than 1.33,
the method comprising the steps of:
inserting a take-up roller into the axis hole and affixing the core to the take-up roller,
the take-up roller having a diameter that is smaller than the diameter of the axis hole; and
winding the battery separator around the core while rotating the core along with the take-up roller,
the battery separator having a meandering width less than 1.00 mm.

6. A method of producing a separator roll,
the separator roll including a core and a battery separator wound around the core,
the core having an axis hole along a central axis of the core,
the core having a diameter of less than 125 mm,
a diameter ratio, obtained by dividing the diameter of the core by a diameter of the axis hole is not less than 1.25 and not more than 1.33,
the method comprising the steps of:
inserting a take-up roller into the axis hole and affixing the core to the take-up roller,
the take-up roller having a diameter that is smaller than the diameter of the axis hole; and
winding the battery separator around the core while rotating the core along with the take-up roller,
the battery separator having a meandering width less than 1.00 mm.

* * * * *